June 7, 1927.
J. F. MORGAL
1,631,499
CHUCK
Filed July 13, 1922
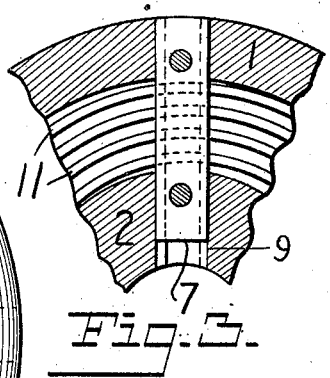
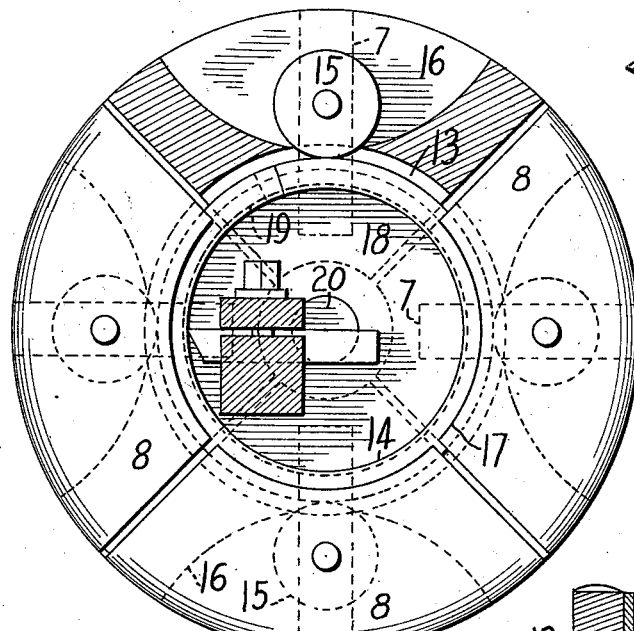
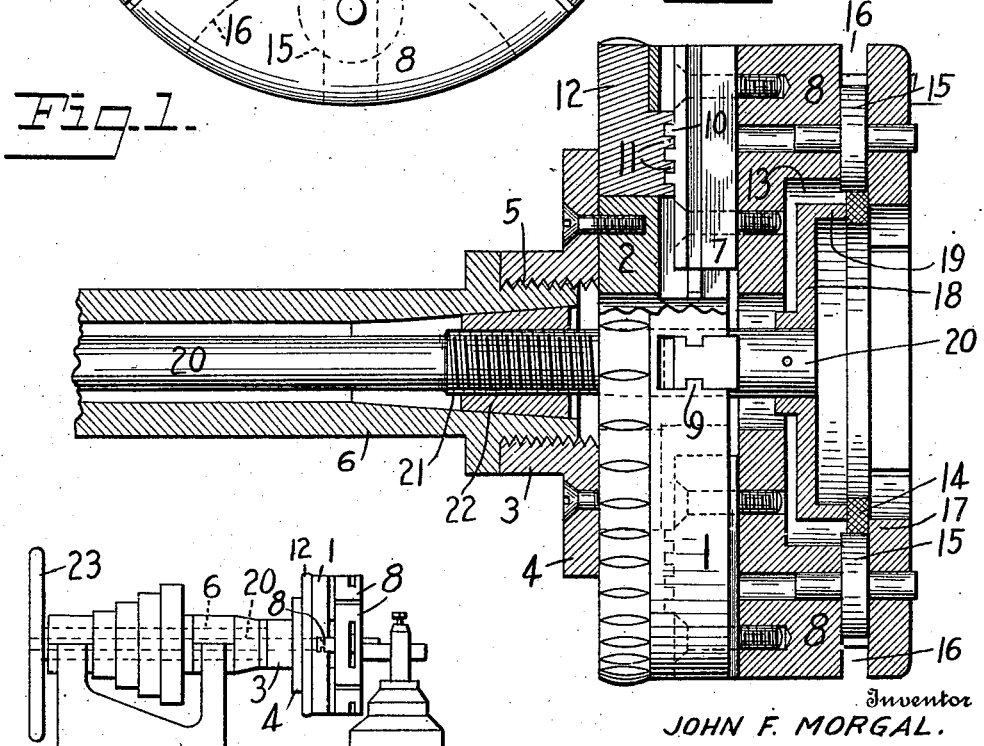
Inventor
JOHN F. MORGAL.
Attorney Patented June 7, 1927.

1,631,499

UNITED STATES PATENT OFFICE.

JOHN F. MORGAL, OF SPRINGFIELD, OHIO.

CHUCK.

Application filed July 13, 1922. Serial No. 574,793.

This invention relates to chucks for holding piston rings and the like while work is being performed thereon.

A piston ring is usually cast and a portion of the ring cut away to form an opening therein so that when compressed the ring will have a tendency to expand. The ring is then compressed to close the opening and is finished to true circular form.

The purpose of the present invention is to provide a device by means of which the ring may be compressed to close the same and then held rigidly in its closed position during the finishing thereof and more particularly during the finishing of the inner surface thereof.

A further object of the invention is to provide a device of this kind having means for first closing the ring and then clamping the same to hold it against movement relatively to the device as a whole.

A further object of the invention is to provide such a device which will be simple in its construction and operation and which can be quickly and easily operated.

Other objects of the invention may appear as the device is described in detail.

In the accompanying drawings Fig. 1 is a front elevation of a chuck embodying my invention with one of the jaws in section; Fig. 2 is a longitudinal sectional view taken centrally thereof and partly in elevation; Fig. 3 is a sectional detail view of the actuating plate for the jaws; and Fig. 4 is a side elevation showing the chuck mounted on a lathe.

In these drawings I have illustrated one embodiment of my invention and have shown the same as comprising a plurality of jaws for compressing the ring to close the opening and as having clamping members to engage the ring after it has been compressed and hold it against all movement relatively to the chuck as a whole. It will be understood, however, that this particular form of the device has been chosen for the purpose of illustration only and that the chuck may take various forms and may be used in connection with various articles, other than piston rings, without departing from the spirit of my invention.

In that form of the device here shown the chuck comprises a body portion 1 which forms the support for the jaws and is here shown as a circular plate having a reduced rear portion 2 to which is rigidly secured a hub 3 having a flange 4, the periphery of which preferably extends a short distance beyond the periphery of the reduced portion 2 of the supporting structure. This hub, as here shown, is provided with internal screw threads 5 by means of which it may be attached to a spindle 6 which is in the present instance hollow. Movably mounted on the body portion, or supporting structure, 1, are a plurality of jaws 7 which are preferably mounted for radial movement relatively to the supporting structure and which, in the present form of the device, are sector-like in shape. Each jaw has a part adapted to engage the outer periphery of the ring so that when the several jaws are moved one toward the other the ring will be compressed and the opening therein closed. The jaws may be mounted on the supporting structure in various ways, but as here shown, each jaw has rigidly secured thereto a guide block 8 which is slidably mounted in a guideway 9 formed in the supporting structure and extending radially thereof. Any suitable means may be provided for moving the jaws relatively to the supporting structure but it is desirable that they should be moved simultaneously and to the same extent so that the same pressure will be applied to the ring at its point of contact with each jaw. I have, therefore, shown the guide blocks 8 as having rearwardly extending projections, or teeth, 10 adapted to engage threads, or spiral grooves, 11 formed in the inner face of an adjusting plate 12 rotatably mounted on the supporting structure. As here shown, this plate is in the form of a wide ring rotatably mounted upon the reduced portion 2 of the supporting structure between the forward portion of the same and the flange 4 of the hub 3. It will be apparent, therefore, that the rotation of the adjusting plate will impart radial movement to the jaws.

The jaws may have any suitable shape but, as here shown, the inner portion of each sector is cut away so that the outer portions of the several sectors will form between them a cavity, or recess, 13 to receive the ring, which is shown at 14. It is desirable that the jaws should have narrow points of contact with the ring in order that the latter may adjust itself relatively thereto during the closing operation. For this purpose and to facilitate the movement of the ring relatively to the jaws, I have mounted in the outer portion of each jaw a roller 15, the peripheries of which project beyond the inner surfaces of said portions of said jaws and constitute the contact portions of the jaws. Preferably each jaw is provided with a slot, or recess, 16 in which the roller is mounted.

In order to properly aline the ring after it has been closed and to hold the same against movement while work is being performed thereon, a suitable holding, or clamping device is provided and adapted to grip the ring after it has been closed. As here shown, the outer portion of each sector-like jaw has an inwardly extending flange 17 arranged in front of its roller and adapted to overlap the outer surface of the ring when the latter has been closed. These flanges constitute one member of a clamp, the other member of which is mounted within the cavity 13 in the rear of the ring and is adapted to be moved into and out of engagement with the ring. As here shown, this second clamping member is in the form of a plate 18 having a flange 19 adapted to engage the rear surface of the ring. The flange 19 is of an internal diameter somewhat greater than the internal diameter of the closed ring so that when in contact with the ring it will be located a sufficient distance from the inner periphery thereof to avoid any interference with the working or finishing of this surface. This second clamping member may be actuated in any suitable manner, but as here shown it is actuated by a rod, or shaft, 20 connected therewith and having a screw threaded portion 21 mounted in a bushing 22 inserted in the end of the hollow spindle 6. The shaft extends beyond the rear end of the spindle and may be provided with a hand wheel 23, or other suitable means for rotating the same, as shown in Fig. 4.

In using the chuck, the jaws are first moved to their open positions and a ring inserted in the cavity between the same, the ring being supported by the lower jaw. The adjusting plate 12 is then actuated to move the jaws inwardly and cause the same, through the medium of the rollers, 15, to compress the ring. When the ring has been closed the clamping member 18 is actuated and caused to engage the rear face of the ring and force the same against the front clamping member, or flanges, 17, thereby alining the ring and clamping the same rigidly against movement during the performance of the work thereon. A tool is then inserted through the opening formed between the flanges 17 of the several jaws and the chuck and the ring are rotated to cause the inner surface of the ring to be finished in the usual manner. It will be understood, of course, that the chuck may, if desired, remain stationary and the tool be moved relatively thereto.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a device of the character described, a supporting structure, compression members carried by said structure and having relatively small contact surfaces to engage the periphery of a split ring and compress the same, said members having parts to engage one of the lateral faces of said ring, an annular member arranged to engage the other face of said ring and clamp the same against said parts of said members, and means to actuate said annular member.

2. In a device for holding split rings, a supporting structure, a plurality of jaws movably mounted on said structure and having parts to engage the periphery of a split ring, means for actuating said jaws to cause them to compress said ring, clamping members carried by the respective jaws to engage one face of said ring, a clamping member to engage the other face of said ring, and means mounted for axial movement relatively to said structure to actuate the last mentioned clamping member.

3. In a device of the character described, a supporting structure, a plurality of jaws mounted for radial movement on said structure, each of said jaws having a part extending forwardly therefrom, said parts of the several jaws being arranged to form a cavity between them and having inwardly extending flanges at their forward edges, means for actuating said jaws, a clamping member arranged within said cavity to clamp a ring against the flanges of said jaws, and means to actuate said clamping member.

4. In a device of the character described, a supporting structure, a plurality of jaws mounted for radial movement on said structure, each of said jaws having a part extending forwardly therefrom, said parts of the several jaws being arranged to form a cavity between them and having inwardly extending flanges at their forward edges, means for actuating said jaws, an annular clamping member arranged to the rear of said flanges, and means for actuating said clamping member to cause it to engage a ring and clamp the same against said flanges.

5. In a device of the character described, a supporting structure, a plurality of jaws movably mounted on said structure and each having a part projecting forwardly therefrom, said parts being arranged to form a cavity between them and each part having near its forward edge an inwardly extending flange, a roller mounted in each jaw and having the inner portion of its periphery extending beyond the wall of said cavity but spaced from the inner edge of said flange, means for actuating said jaws, a clamping member mounted in said cavity and having an annular flange, and means for actuating said clamping member to cause said flange to engage a ring mounted in said cavity and clamp the same against said flanges.

In testimony whereof, I affix my signature hereto.

JOHN F. MORGAL.